United States Patent Office 2,826,596
Patented Mar. 11, 1958

2,826,596

EMULSIFIER COMPOSITION AND METHOD OF MAKING THE SAME

Charles E. Maher, Chicago, Ill.

No Drawing. Application May 10, 1956
Serial No. 583,946

2 Claims. (Cl. 260—401)

This invention relates to an emulsifier base composition and to a method of preparing the same.

More particularly, the present invention relates to an emulsifier base composition which is particularly adapted for use as an emulsifier base in emulsifying mineral oils, such as paraffin oils, for subsequent use, when diluted with water, in the treatment of degreased wool while, at the same time, being useful as an emulsifier base for emulsifying vegetable and animal fats used for or as textile finishes, as an emulsifier base for coolant oils, solvent-degreasing compounds, as an emulsifier base for insecticide water-in-oil mixtures, and as a base for dry cleaning-soap compositions used in the dry cleaning industry, as an emulsifier in general, and also for use as a wetting agent, as a flotation agent, and as a detergent.

One of the problems heretofore experienced in connection with emulsifiers or emulsifier bases used for emulsifying mineral oils, such as paraffin oils, which when diluted with water are used in the treatment of wool, is that such prior emulsifiers or emulsifier bases have been extremely delicate and have required either the use of an adjusting or coupling agent such, for example, as hexylene glycol-carbitol, butyl carbitol, butyl cellulose, or an alcohol, or the services of a skilled chemist to accomplish the proper mixing, thereby adding materially to the cost involved in the use of such prior emulsifiers or emulsifier bases. Hence the elimination of the need for the use of such adjusting or coupling agents, or the services of a skilled chemist to effect the proper mixing of the mineral oil and emulsifier base, and the provision of a permanently stable emulsifier base which can be mixed directly into the mineral oil at atmospheric temperatures, to form a permanently stable oil-water emulsion, has been something which has been particularly desired by the wool industry for some time.

Accordingly, an object of the present invention is to provide a new and improved permanently stable emulsifier base composition which is particularly useful as an emulsifier base composition for use with mineral oils, such as paraffin oil, and the like, for the treatment of degreased wool and which does not require the use of any coupling or adjusting agent to maintain the desired balance between the mineral oil and the emulsifier base, nor the services of a skilled chemist to effect the proper mixing of the mineral oil and emulsifier base, but which merely requires that it be added to and stirred or mixed at atmospheric temperature with the mineral oil to effect the desired conditioning of the mineral oil for emulsification with water.

Another object of the present invention is to provide a new and improved emulsifier base composition which, while being particularly suitable for use as an emulsifier base composition for mineral oil-water emulsions used in the treatment of degreased wool, is likewise well adapted for use as an emulsifier base for emulsifying vegetable and animal fats, such as are used for or as textile finishes, as an emulsifier base for cutting and coolant oils, solvent-degreasing compounds, and insecticide mixtures and as a base for dry cleaning-soap compositions used in the dry cleaning industry, and as an emulsifier base, in general.

A further object of the present invention is to provide a novel and improved method of making the new emulsifier base composition.

Other objects will appear hereinafter.

In the practice of the present invention I may prepare the new emulsifier base composition according to any of the formulae illustrated in the following examples, in which all parts indicated are in terms of parts or percent by weight:

Example 1

| | Percent by weight |
|---|---|
| Alkyl-aryl sulphonic acid (keryl-benzene sulfonic acid) | 52 |
| Diethanolamine | 24 |
| Fatty acid (coconut oil) | 24 |
| | 100 |

The mixture of reactants set forth in Example 1 is condensed by heating the same at a temperature of from 150° to 160° C. for a period of about five hours, the desired end of the reaction being indicated by the fact that the end reaction product is completely soluble in gasoline and in paraffin oil, and if not, further heating is required. If the reaction has been completed, the resulting emulsifier base reaction product will readily emulsify in water and is in the form of a paste or heavy viscous liquid which is from light amber to brown in color and is completely soluble in hydrocarbons and other standard solvents and is readily dispersible in water. However, high temperatures are to be avoided in the condensing reaction as will be explained, because it has been found that when temperatures of around 200° C. are used the condensation proceeds to a point where an entirely different reaction product is formed and which is not suitable for the purposes of the present invention.

Example 2

| | Percent by weight |
|---|---|
| Alkyl-aryl sulphonic acid (keryl-benzene sulfonic acid) | 46 |
| Monoethanolamine | 16 |
| Fatty acid (tall oil) | 38 |
| | 100 |

The composition set forth in the foregoing Example 2 is heated at the same temperature and for the same period of time as is set forth in Example 1, whereupon the resulting end reaction product or emulsifier base composition will have substantially the same characteristics as set forth above in connection with the new emulsifier base composition made in accordance with Example 1.

In the practice of the present invention I may employ various other alkyl-aryl sulfonic acids, saturated or unsaturated, in lieu of or in admixture with the alkyl-aryl sulfonic acid specified in the foregoing Examples 1 and 2, in equivalent amounts, and among these are the following: hexyl, octyl, nonyl, and dodecyl benzene, phenol or naphthalene sulfonic acids, or unsubstituted benzene or naphthalene sulfonic acid.

In place of the alkyl-aryl sulfonic acids referred to above, I may substitute equivalent amounts of the corresponding alkyl-aryl acid sulphates, acid phosphates and phosphonic acids.

In lieu of the fatty acids employed in Examples 1 and 2, I may substitute other fatty acids, animal or vegetable, and other carboxy acid derivatives of the RCOOH or R(COOH)$_n$ series, and representative among these are the following: acetic acid, benzoic acid and salicylic acid, (aromatic carboxy acids) maleic acid, stearic acid, propionic acid and so on. Broadly, I can use any carboxylic acid capable of esterification, but the best results are obtained with long-chain or aromatic carboxylic acids since these are more soluble in non-polar solvents than are the acids having smaller molecules.

Additionally, I may use as a substitute for any of the above listed alkyl-aryl or aryl sulfur or phosphorous containing materials, sulfonated, sulfated, phosphonated, or phosphated fatty acids or fatty alcohols such as castor fatty acid, oleic acid, palmitic acid or lauryl, acetyl, and oleyl alcohol.

Thus, additional compositions and formulae therefor which may be employed in making the new emulsifier base composition, using certain of the substituent materials referred to above, in lieu of certain of those specified in Examples 1 and 2, but employing the same reaction conditions are illustrated in the following examples in which all parts indicated are in terms of percent by weight:

Example 3

| | Percent by weight |
|---|---|
| Acid sulfate of castor oil fatty acid | 52 |
| Diethanolamine | 20 |
| Fatty acid (castor oil) | 28 |
| | 100 |

Example 4

| | |
|---|---|
| Octyl-2 acid phosphate | 52 |
| Diethanolamine | 24 |
| Fatty acid (oleic acid) | 24 |
| | 100 |

Example 5

| | |
|---|---|
| Fatty alcohol acid sulphate (lauryl acid sulphate) | 46 |
| Monoethanolamine | 16 |
| Fatty acid (coconut fatty acid) | 38 |
| | 100 |

Example 6

| | |
|---|---|
| Nonyl phosphonic acid | 55 |
| Monoethanolamine | 18 |
| Fatty acid (stearic acid) | 27 |
| | 100 |

It will be appreciated that any mono or di-alcohol amine (alkylolamine) can be used or mixtures thereof, including propanol amine, diisopropanol amine, ethylethanol amine, trishydoxy methyl amino methane, and that I am not limited to any particular amine, except that tertiary amines cannot be used because these will not form amides with the sulfur or phosphorous containing material. Because of availability, alkylolamines are preferred, but arylolamines can be used. Accordingly, the end product may or may not be completely esterified depending upon whether a mono- or dialkylol or arylol amine is used and whether one or two moles of fatty acid, or the equivalent, are esterified therewith.

It is further my belief that in the practice of the present invention, as typified by Example 1, the condensation reaction at the temperature specified (150°–160° C.) results in the formation of a single primary reaction product which is an alkyl-aryl sulfonamide-alkylol fatty acid ester.

Thus, I believe that the reaction which takes place during a typical condensation reaction, such as represented by Example 1, is illustrated in the following equation:

$$\underset{RSO_3H}{\text{(Alkyl-aryl sulfonic acid)}} + \underset{NH(R'OH)_2}{\text{(diethanolamine)}} + \underset{R''COOH}{\text{(Carboxy acid)}} \longrightarrow RSO_2-\underset{R'OH}{N}-R'OOCR'' + 2H_2O$$

and that the novel properties and characteristics of the new emulsifier base composition are due to the formation, as in Example 1, of the sulphonamide at the front of the amine nitrogen and the formation of the alcohol-acid ester on the other or ethanol end of the amine.

Inasmuch as a monoalkylolamine, e. g. monoethanolamine, can be used as an alkylolamine reactant, or trishydroxy methyl amino methane $NH_2-C-(CH_2OH)_3$, the above equation is more properly expressed as:

$$RMO_nH + \underset{X}{\overset{H}{N}}-R'OH + R''COOH \longrightarrow RMO_{(n-1)}-\underset{X}{N}-R'OOCR'' + 2H_2O$$

wherein:

R is an aliphatic, aromatic or aliphatic-aromatic radical
M is a phosphorous or sulfur
$n$ is a whole number, 3 or 4
X is hydrogen or an —R'OH alcohol radical
R' and R'' are aliphatic or aromatic radicals in the corresponding alcohol-amine or carboxy acid groups.

Thus, at least one amino hydrogen is required to combine with the hydroxyl-OH group present in $RMO_nH$ to produce one mole of water during condensation, and a second mole of water is produced as an incident to esterification.

The condensation reaction must not be allowed to proceed at a temperature substantially in excess of 200° C., because unsatisfactory ring compounds are produced and desulfurization occurs. Temperatures below 150° C. can be used, say about 120° C. if the time of reaction is correspondingly increased, but in this circumstance care must be used to assure that condensation is complete, otherwise the end product will be contaminated with unesterified side products.

It will thus be seen from the foregoing description that the present invention provides a new and improved emulsifier base composition, and a novel method of making the same, having the desirable advantages and characteristics and accomplishing its intended objects, including those hereinbefore set forth, and others which are inherent in the invention.

I claim:

1. A method of preparing an emulsifier base composition comprising: preparing a mixture of condensation reactants including: (1) a material selected from the group consisting of keryl, hexyl, octyl, nonyl, and dodecyl monocyclic aryl sulfonic acids and phosphonic acids; and the acid sulfates of the hydroxylated higher fatty acids and the acid sulfates of the hydroxylated higher fatty alcohols; and octyl-2 acid phosphate and nonyl phosphonic acid; (2) a higher fatty acid; and (3) an alcohol amine selected from the group consisting of mono and di-alkanol amines; reacting said mixture of condensation reactants at a temperature of between 120–180° C. and below 200° C. for a time sufficient to produce a condensation reaction end product in the form of an amide selected from the group consisting of sulf and phospho-amides of the ester of the fatty acid and the alcohol and which end product is a liquid emulsifier base composition soluble in gasoline and paraffin oil and useful as an emulsifier base for oil-in-water emulsions.

2. An end product produced in accordance with the method of claim 1.

References Cited in the file of this patent

UNITED STATES PATENTS

| 2,305,083 | Jayne et al. | Dec. 15, 1942 |
| 2,496,651 | Aeloney | Feb. 7, 1950 |
| 2,599,391 | Katzman | June 3, 1952 |